United States Patent [19]
Norton et al.

[11] 3,720,710
[45] March 13, 1973

[54] CARBONYL COMPOUNDS FROM ALLENE AND ITS DERIVATIVES

[75] Inventors: Charles J. Norton, Berkeley, Calif.; Edward Hurley, Jr., Littleton, Colo.

[73] Assignee: Marathon Oil Company, Findlay, Ohio

[22] Filed: Nov. 1, 1968

[21] Appl. No.: 772,866

[52] U.S. Cl. .......260/533 R, 260/94.2 R, 260/247.7, 260/326.5, 260/343.2, 260/362, 260/485 R, 260/479 R, 260/491, 260/515 R, 260/502.6, 260/520, 260/533 N, 260/537 R, 260/544 L, 260/544 Y
[51] Int. Cl. ............................................C07c 55/02
[58] Field of Search..260/485, 526, 526 U, 533, 537, 260/594, 597 R

[56] References Cited

UNITED STATES PATENTS 3,600,420    8/1971    Illingworth.......................260/455 C

FOREIGN PATENTS OR APPLICATIONS

40/18,724    8/1965    Japan................................260/594

OTHER PUBLICATIONS

Cram & Hammond Organic Chemistry (1964) pgs 25 & 684–685

Primary Examiner—Lorraine A. Weinberger
Assistant Examiner—Richard D. Kelly
Attorney—Joseph C. Herring, Richard C. Willson, Jr. and Jack L. Hummel

[57] ABSTRACT

Organic carbonyl compounds containing at least five carbon atoms are prepared by reacting an organic carbonyl compound having at least one hydrogen alpha to the carbonyl group with an acyclic organic compound containing at least two adjacent carbon to carbon double bonds at a temperature of from −50° to 200° C for a period of from 0.1 to about 100 hours in the presence of a free radical initiator. A mixture of monomeric and polymeric carbonyl products are formed. Selectivity to any particular weight product is monitored by selection of the mole ratio of reactants. As a specific example, reaction of allene with excess acetic acid forms a product mixture comprising pimelic acid, allyl acetic acid and a resin acid of average gram molecular weight between about 200 and about 2,000. These synthetic resin acids may be used as substitutes for naturally occurring organic acids or may be used to control the molecular weight or cross linking in polyesters.

5 Claims, No Drawings

CARBONYL COMPOUNDS FROM ALLENE AND ITS DERIVATIVES

BACKGROUND OF THE INVENTION

The field of this invention relates to compounds having carbonyl groups and a method for their preparation. It particularly relates to a method of preparing these compounds by reacting a cumulene such as allene or a substituted derivative thereof with a carbonyl compound.

Recently, there has been much interest shown in the utilization of allene and similar compounds in various reactions. One area which has been followed with particular attention is the free radical additions of various reagents to allene, as exemplified in "The Chemistry of Allenes," *Chemical Reviews of June*, 1967, David R. Taylor, Sept. 16, 1966, pp. 340-341. The interest in allenes has been at least partially due to the fact that they are now economically obtainable from petro-chemical operations. One particularly inexpensive source of allene is from a petroleum refining cut known as MAPP gas or cuts of a similar composition comprising allene. MAPP gas is the registered trademark of a fuel introduced by the Dow Chemical Company which basically comprises methyl acetylene, allene, propane, and propylene. It is generally produced by cracking propylene or isobutylene or their mixtures. Although MAPP gas has found some utility as a cutting fuel, it has not approached the quality of acetylene and is not particularly suitable for welding or similar purposes. The ready availability of MAPP-type gas from ordinary hydrocarbon cracking operations has stimulated interest in finding a utility therefor. A problem which has existed in the art is the prohibitively high cost of preparing mono and polyfunctional carboxylic acids having at least five carbon atoms in their chain. Examples of these often rare and expensive chemicals are allyl acetic acid and pimelic acid, whose methods of preparation involve alternative, multi-step synthesis. The use of allene in accordance with the present invention furnishes a very economically attractive route to these valuable and versatile chemicals. Furthermore, heretofore it has been uneconomical to produce higher molecular weight resin acids because of problems similar to those of preparing the monomeric acids described above.

The present invention furnishes an economical route for the preparation of a variety of products among which are monomeric and polymeric mono- and polyfunctional carboxylic acids.

SUMMARY OF THE INVENTION

We have found that under free radical conditions and within proper temperature ranges and contact times, carbonyl compounds having at least one hydrogen alpha to the carbonyl group react with allene or a cumulene or a substituted derivative thereof to form a mixture of organic carbonyl compounds having at least five carbon atoms comprising monomeric, and polymeric carbonyl compounds. Utilization of an excess of the allene reactant will produce the more polymeric, resinous, high molecular weight product mixture whereas upon utilization of an excess of carbonyl reactant, one will form preferentially the monomeric carbonyl compounds along with some oligomeric configurations. Minor amounts of electrophilic addition products are generally formed even though the reaction is conducted under substantially free radical conditions.

Long-chained carboxylic acids are formed when utilizing a carboxylic acid carbonyl reactant. As an example, allyl acetic acid and pimelic acid are produced when allene and preferably an excess of acetic acid are reacted under free radical conditions. In general, long chain acids are useful in the formation of polyesters, polyamides, and in other polymer formulations. These are other varied uses such as in the biosynthesis of biotin by the mold "Aspergillus niger," whereupon this biosynthesis is greatly increased by addition of pimelic acid.

A specific application of the resinous acid product formed in this reaction is its use as a substitute for naturally occurring organic acids of a similar structure. These resins may also be used to control the molecular weight of and cross-linking in polyesters.

PREFERRED EMBODIMENTS OF THE INVENTION

The following equation (1) typifies the reaction of the present invention where a carbonyl derivative (I) reacts with an allene derivative (II) to give the organic carbonyl compound product (III), which contains at least five carbon atoms.

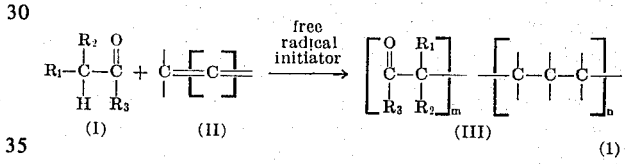

(1)

The product will, in general, contain a mixture of compounds depending on the integer values of $m$ and $n$, the selectivity to which may be controlled by selection of a particular mole ratio of reactants I and II as will hereinafter be more fully described. The dashed line between the carbon atoms in the product (III) means that there may be unsaturation.

Referring to equation 1 above, the carbonyl reactant (I) may be selected from a large group of carbonyl compounds. Thus, $R_1$, $R_2$, and $R_3$ may be the same or different and may, for example, be selected from the group of hydrogen, alkyl, alkenyl, aryl, aralkyl, cycloalkyl, cycloalkenyl, halogens, carboxylic acid groups, lactams, lactones, hydroxyl, amines, amides, anhydrides, hetero atom analogs, etc., or any other group which is a non-interferring substituent in the free radical initiation reaction. The critical requirement of the carbonyl compound is that the carbon alpha to the carbonyl carbon has at least one active hydrogen substituted thereon. Examples of useful carbonyl reactants for the present invention include: acid anhydrides, exemplified by acetic anhydride, propionic anhydride, glutaconic anhydride, and the like; acid halides, exemplified by acetyl chloride, butyryl bromide, propionimidoyl chloride (where the carbonyl carbon is double bonded to N instead of O as in equation (1) cyclohexanecarbonyl chloride, and the like; carboxylic acids, exemplified by acetic acid, propionic acid, butyric acid, 5-chloro-valeric acid, acrylic acid, crotonic acid, benzylic acid, malonic acid, succinic acid, maleic acid, adipic acid, dodecanedioic acid, dithio-butyric acid (where the carbonyl acarbon is double bonded to S instead of O), malonaldehydic acid, pyruvic acid, beta-alanine, and the like; aldehydes, exemplified by undecanal, acetal aldehyde, crotonaldehyde, p-tolualdehyde, undecanethial, and the like; amides, exemplified by acetamide, acrylamide, diacetyamide, acetanilide, and the like; esters, exemplified by methyl acetate, n-amyl acetate, isoamyl n-butyrate, phenyl acetate, vinyl acetate, and the like; imides, exemplified by succinimide, phthalimide, and 2-hexenimide, and the like; imines, exemplified by cyclohexanimine, and the like; ketones, exemplified by acetone, 2-pentanone, cyclobutyl ketone, 1,4-cyclohexandione, and the like; lactams, exemplified by 2-pyrrolidinone; lactones exemplified by 2-morpholinone, and coumarin, and the like; thiones, exemplified by cyclohexane thione, and the like. The most preferred carbonyl compounds are the carboxylic acid having 2 to 30 carbon atoms or derivatives thereof derivatives, with special preference for the carboxylic acids having from two to five carbon atoms per molecule, such as acetic acid, propionic acid, and corresponding di and polyacids. Acetic acid is most preferred for economical reasons.

Reactant (II) is a cumulene derivative and most preferably allene, but in general any acyclic organic compound containing at least 2 adjacent carbon-to-carbon double bonds can be utilized. Other examples besides allene are: tetramethylallene, 1-methyl-1-ethyl-3-propyl-3-methyl-allene, 1,3-diphenyl allene, 1-cyclohexyl allene, and other substituted allenes where the substituents are non-interferring with respect to the free radical addition reaction; other cumulenes such as butatriene, 1,phenyl-5-methyl-pentatetraiene, and other substituted or unsubstituted cumulenes; alkenyl substituted allenes exemplified by 1,-ethene-3(ω-undecane)allene, or other unsaturated substituted allenes such as 1,ethyne-allene, and the like. Besides allene, the more preferred starting materials are the lower alkyl, that is, substituents having carbon numbers $C_1$ through $C_6$, substituted allene. A stream containing allene such as a MAPP gas cut, or similar distillation cut, provides a very economical source for allene.

Various peroxides and hydroperoxides, organic and inorganic, and other free radical initiators, may be utilized to initiate the reaction of this invention. Thus, alpha olefins containing from about six to about 30 carbon atoms can be peroxidized by bubbling air or some other oxygen-containing gas through a solution of the olefins to form hydroperoxides and peroxides with excellent half-life characteristics. However, the most preferred free radical initiators useful for the present invention are the organic peroxides and hydroperoxides commercially available. Examples of these compounds include: 2,4-dichlorobenzoyl peroxide, caprylyl peroxide, t-butylperoxypivalate, azodiisobutyronitrile, decanoyl peroxide, lauryl peroxide, propionyl peroxide, acetyl peroxide, benzoyl peroxide, p-chlorobenzoyl peroxide, t-butylperoxyisobutyrate, 2,5-dimethyl-2,5-bis(benzoylperoxy)hexane, hydroxyheptyl peroxide, cyclohexanoneperoxide, t-butylperacetate, methylethylketoneperoxides, t-butylperbenzylate, di-t-butyldiperthalate, p-methane hydroperoxide, cumenehydroperoxide, 2,5-dimethyl2,5-bis(t-butylperoxy)hexane, t-butyl-hydroperoxide 70%, di-p-butylperoxide, 2,5-dimethyl-2,5-bis(t-butylperoxy) hexyne-3, 2,5-dimethyl-2,5-bis(hydroperoxy) hexane, and t-butyl hydroperoxide (90%). The most preferred free radical initiators at most reaction temperatures are di-t-butyl peroxide, benzoyl peroxide, azodiisobutyronitrile, t-butyl perbenzoate.

Although temperature is not narrowly critical to this reaction, and preferably is from about −50° to about 200°C and more preferably from about −25° to about 150° and most preferably from about 50° to about 130°C, in general for most carbonyl reactants selectively toward terminal additions to the allene will be preferred at lower temperatures, whereas elevated temperatures may cause substitutions on the beta carbon atom in the allene group. Another factor regarding temperature which should be taken into account is the particular free radical initiator employed. Specifically, free radical initiators have half-lives which are dependent upon the temperature, so that efficient utilization of the particular initiator requires proper selection of temperature, so as to maintain desired contact times and yields.

Pressure is not narrowly critical to this reaction, and preferably ranges from about 0.01 to about 100 and more preferably from about 1.0 to about 20 atmospheres are desirable. Ambient pressures are utilized advantageously.

The reaction time will generally depend upon the particular reactants used, the temperature at which the reaction is run, and the reactivity of the free radical initiator. But in general, contact times of from about 0.1 hr. to about 100 hr. are preferred, with times of from about 1 hr. to about 20 hr. being more preferred.

The products (III) of this reaction as depicted in equation (I) generally comprise a mixture of monomeric and polymeric groups where $m$ and $n$ take on different integer values from one to about 18. We choose to call those compounds in which the value of $n$ equals 1 as monomeric products, and those compounds in which $n$ is greater than 1 as oligomeric or polymeric. If $m$ is 1 we call them mono functional, if $m$ is 2, difunctional, etc. A specific example of the products of this reaction when acetic acid is reacted with allene in the presence of di-t-butyl peroxide will more clearly demonstrate the product composition in accordance with this invention, depicted below:

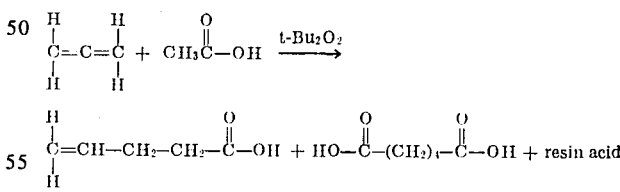

The selectivity to any type product may be controlled by proper selection of the mole ratio of reactants. Specifically, for the case of addition of acetic acid to allene, employing an excess of acetic acid yields a product mixture which is predominantly monomeric in configuration. On the other hand, shifting the ratio in favor of the allene reactant produces a predominantly resinous product. The resin acids formed from reaction of carboxylic acids and an allene derivative in general will consist of novel polymeric units of the following average structure:

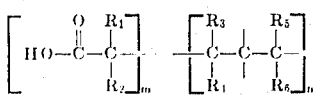

where $R_1$ and $R_2$ correspond to the same $R_1$ and $R_2$ substituents on the carbonyl reactant from equation (1), and $R_3$, $R_4$, $R_5$ and $R_6$ are selected from the same group of substituents as $R_1$ and $R_2$ but are all preferably hydrogen or additional allyl radicals. The resin will be composed of at least 20 mole percent of the first group (subscripted by $m$) and at least 10 mole percent of the second group (subscripted by $n$). The vertical bonds on the central carbon atom in the allene unit above represents either cross linking between other units, or may be double bonds between adjacent carbon atoms in the unit. The values of $m$ and $n$ are integers from about 2 to about 20. Again, $n$ and $m$ will take on the relatively higher values when the mole ratio of allene to acetic acid takes on progressively larger values. But in general, there are preferably from about 1 to about 10 and more preferably from about 2 to about 8 and most preferably from about 3 to about 5 moles of allenic reactant per mole of carbonyl reactant when a resin acid is desired. The reverse ranges are preferred for preparing the low molecular weight products.

A solvent may be employed within the reaction mixture so long as it is inert with respect to the free radical addition reaction. Solvents which could be suitably employed are exemplified by carbon tetrachloride and chlorobenzene, although in general the reaction proceeds favorably without utilization of such solvents. If possible, the reaction should be conducted in substantially anhydrous conditions. Water in the system will enhance by-product formation. Particularly, in the acetic acid—allene reaction the electrophilic addition product isopropenyl acetate will be formed in considerable amounts if aqueous conditions exist. Acetic anhydride may be advantageously utilized to take up any water present. Also, conducting the reaction at temperatures above about 150°C may cause undesirable electrophilic addition or polymerization of the allene.

When the preferred carboxylic acids are employed as starting materials, the mono and diacid products may be recovered by conventional distillation or by esterification and distillation. The resinous acids will remain since their boiling points are much higher than the mono and diacid products.

The following examples, while describing a preferred embodiment of the process and products of this invention, are merely illustrative of this invention and are not meant to be limitive in any way.

EXAMPLE 1

Into a tared 250 ml. glass Fischer Porter tube immersed in a dry ice/acetone bath, equipped with a drying tube to exclude moisture, 3.5 gms. (0.0875 moles) allene gas are allowed to condense. 143.8 gms. (2.39 moles) of acetic acid and 2.13 gms. (0.0146 moles) of ditertiary butyl peroxide are added and the tube is sealed and weighed. The tube is then placed in a heater attached to a rocking autoclave and rocked at 130°C. for 10 hours. After the reaction, the tube is weighed, showing no appreciable weight loss, and then vented upside down letting the gas pressure force the contents into a distillation apparatus, comprising a 250 ml. pot with 18 inch vigreux column, condenser, and fraction collector attached to two dry ice/acetone traps. The conversion of allene is found to be 58 percent, and the yield of allyl acetic acid is 3.41 percent by weight and the yield of pimelic acid is 0.34 percent by weight, as determined by gas-liquid chromatography. Acetone is also present in the product mixture in a 14 percent by weight yield. The other compounds which are present are principally a mixture of resin acids.

EXAMPLE 2

A similar procedure is used as in Example 1, except that the resinous product is worked up.

4.1 gms. (0.101 moles) of allene and 146.1 gms. (2.41 moles) acetic acid and 2.4 gms. (0.0164 moles) of ditertiary butyl peroxide are charged to a Fischer-Porter tube equipped as in Example 1. The reaction is heated to 130° for 17 hours. The tube is then vented upside down, transferred to a distillation flask, and distilled through a 12 inch vigreux column at atmospheric pressure. Various low-boiling cuts are taken, including 1.4 gms. of allene, giving a conversion of 66 percent based on the allene charged by weight. Other low boilers are taken off, including isopropenyl acetate, acetone, and a trace of allyl acetic acid, but no pimellic acid. To the remainder of the pot is slowly added water, giving a gummy solid precipitate. This precipitate is filtered and dissolved in ethyl acetate and dried with sodium sulfate. The ethyl acetate is removed by distillation. The weight of the crude product is 3.2 gms. Infra-red spectra shows that the product has acid groupings as substituents. The crude acid product is dissolved in diethyl ether, and petroleum ether added. A hexane soluble syrupy liquid is recovered as well as a solid hexane insoluble portion. The liquid portion is analyzed to have molecular weight of 518 and by a normal titration with base it is determined that the product is a diacid incorporating the following units in its structure:

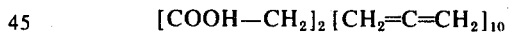

The heavier product has a molecular weight of 702 and is titratable with 232 neutral equivalents of base demonstrating that the compound is a triacid incorporating the following units in its structure:

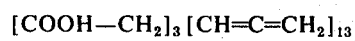

A bromine number is obtained on the crude product mixture before fraction with hexane precipitation. This number indicates, at most, that there are three double bonds in the molecule. This indicates that most of the allene unsaturation must be tied up with cyclization and/or cross-linking.

EXAMPLE 3

The procedure of Example 1 is used except in place of allene is fed a liquefied MAPP-type gas feed (analysis: 0.33 percent ethane, 31.32 percent propane, 8.11 percent propylene, 0.23 percent isobutane, 4.24 percent n-butane, 28.84 percent allene, 26.37 percent methyl acetylene, 10.03 percent butene-1, 0.14 percent isobutene, a trace of 1,3-butadiene, and 0.38 percent unknown). Allyl acetic acid, pimelic acid, and resin acids are recovered and their structure verified by gas-liquid chromatography.

It should be understood that the invention is capable of a variety of modifications and variations which will be made apparent to those skilled in the art by a reading of the specification and which are to be included within the spirit of the claims appended hereto.

What is claimed is:

1. A process for the preparation of resin acids having average molecular weights of from about 200 to about 2,000, said process comprising reacting allene with an organic carbonyl compound having at least 1 hydrogen alpha to the carbonyl group and selected from the class consisting of acid anhydrides, acid halides, carboxylic acids, and esters in the presence of a free radical initiator, wherein from about 2 to about 8 moles of allene are reacted for each mole of said carbonyl group.

2. A process according to claim 1 wherein the organic carbonyl compound is selected from the group consisting of acetic anhydride, propionic anhydride, glutaconic anhydride, acetyl chloride, butyryl bromide, crotonic acid, benzylic acid, malonic acid, succinic acid, maleic acid, adipic acid, dodecanedioic acid, malonaldehydric acid, pyruvic acid, methyl acetate, n-amyl acetate, isoamyl n-butyrate, phenyl acetate, vinyl acetate, and carboxylic acids having from 2 to 5 carbon atoms per molecule.

3. The process of claim 2 wherein the carboxylic acid comprises acetic acid.

4. A process for the preparation of resin acids having average molecular weights of from about 200 to about 2,000, said process comprising reacting a lower alkanoic acid with allene or mono-lower allyl substituted allene at a temperature of about −50° to 200°C. in the presence of a free radical initiator compound for a period of from 0.1 to about 100 hours in the presence of from 0.01 to 10 mole percent radical initiator based on allene, wherein from about 2 to about 8 moles of allene or said mono-lower allyl substituted allene are reacted for each mole of said carbonyl group.

5. A process according to claim 4 wherein the lower alkanoic acid is reacted with allene.

* * * * *